(12) United States Patent
Wilson (10) Patent No.: US 9,013,816 B2
(45) Date of Patent: Apr. 21, 2015

(54) ADAPTIVE PATTERN DETECTION FOR PATTERN-DEPENDENT WRITE CURRENT CONTROL IN A MAGNETIC RECORDING SYSTEM

(71) Applicant: LSI Corporation, San Jose, CA (US)

(72) Inventor: Ross S. Wilson, Menlo Park, CA (US)

(73) Assignee: LSI Corporation, San Jose, CA (US)

( * ) Notice: Subject to any disclaimer, the term of this patent is extended or adjusted under 35 U.S.C. 154(b) by 11 days.

(21) Appl. No.: 14/019,710

(22) Filed: Sep. 6, 2013

(65) Prior Publication Data

US 2015/0062737 A1    Mar. 5, 2015

Related U.S. Application Data

(60) Provisional application No. 61/870,422, filed on Aug. 27, 2013.

(51) Int. Cl.
 *G11B 5/09*   (2006.01)
 *G11B 20/12*  (2006.01)

(52) U.S. Cl.
 CPC ............... *G11B 5/09* (2013.01); *G11B 20/1254* (2013.01)

(58) Field of Classification Search
 CPC ............... G11B 5/09; G11B 20/10212; G11B 20/10194; G11B 5/12; G11B 5/02; G11B 20/10009; G11B 2220/90; G11B 20/1426; G11B 20/1411; G11B 20/1423; G11B 5/035
 USPC ................. 360/67, 45, 43, 41, 75, 40, 44, 39
 See application file for complete search history.

(56) References Cited

U.S. PATENT DOCUMENTS

| | | | | |
|---|---|---|---|---|
| 3,825,683 | A * | 7/1974 | Pitroda et al. | ................. 375/372 |
| 3,879,342 | A * | 4/1975 | Patel | .............................. 360/45 |
| 6,826,003 | B1 | 11/2004 | Subrahmanyam | |
| 7,944,641 | B2 | 5/2011 | Yanagisawa | |
| 2005/0002295 | A1 | 1/2005 | Tsunoda | |
| 2013/0128375 | A1 | 5/2013 | Livshitz et al. | |

* cited by examiner

*Primary Examiner* — Nabil Hindi
(74) *Attorney, Agent, or Firm* — Sulter Swantz pc llo (57) ABSTRACT

The disclosure is directed to a system and method of a system and method for determining fundamental bit cell duration of a data record, which can be used for pattern-dependent write (PDW) current control. According to various embodiments of the disclosure, at least a first portion of a data record is fed through a plurality of delay units. A binary output of each delay unit is stored in at least one register when the delay units have received the first portion of the data record. The register contents are then decoded to determine fundamental bit cell duration of the data record based upon the stored binary outputs.

14 Claims, 9 Drawing Sheets

ADAPTIVE PATTERN DETECTION FOR PATTERN-DEPENDENT WRITE CURRENT CONTROL IN A MAGNETIC RECORDING SYSTEM

PRIORITY

The present application claims priority under 35 U.S.C. §119(e) to U.S. Provisional Application Ser. No. 61/870,422, entitled ADAPTIVE PATTERN DETECTION FOR PATTERN-DEPENDENT WRITE CURRENT CONTROL IN A MAGNETIC RECORDING SYSTEM, By Ross S. Wilson, filed Aug. 27, 2013, an application of which currently co-pending application(s) are entitled to the benefit of the filing date. The above-referenced provisional application is hereby incorporated by reference in its entirety.

FIELD OF INVENTION

The disclosure relates to the field of magnetic recording systems.

BACKGROUND

In some magnetic recording systems, the write current delivered to a magnetic recording head is varied according to transition spacing within a data record being written to a magnetic storage medium, such as a hard disk drive (HDD) platter. For example, Pattern-dependent write (PDW) current overshoot amplitude control is sometimes used to improve recording quality. During recording of magnetic transitions for data records with tightly spaced bits, the magnetic state of the magnetic recording head's pole-tip does not have sufficient time to become magnetically saturated. As such, a PDW current overshoot setting may be used drive the pole tip quickly from one saturated state to the opposite saturated state. A less aggressive overshoot setting is needed for longer prior bit cell durations; whereas, short bit cell durations require a more aggressive overshoot setting for faster magnetic switching. Thus, it is advantageous to dynamically vary the current overshoot amplitude as a function of bit cell duration.

SUMMARY

Various embodiments of the disclosure are directed to a system and method for determining fundamental bit cell duration of a data record. Embodiments of the system include plurality of delay units configured to receive at least a first portion of a data record. A binary output of each delay unit is fed into at least one register. The register is configured to store the binary output of each delay unit when the plurality of delay units have received the first portion of the data record. A decoder is configured to decode the register contents to determine fundamental bit cell duration of the data record based upon the stored binary outputs. In embodiments which are described below, the determined fundamental bit cell duration is used for pattern-dependent write (PDW) current control.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings. The embodiments described below include a system and method for determining fundamental bit cell duration of a data record requiring no calibration and trimming steps. The bit cell duration detection scheme is self-adaptive to varying data rates encountered in zoned recording and is extendable to look-ahead and look-back pattern detection over multiple bit intervals in a data record. Further, the scheme preserves bit cell duration modulation resulting from write pre-compensation.

Figure 1A:
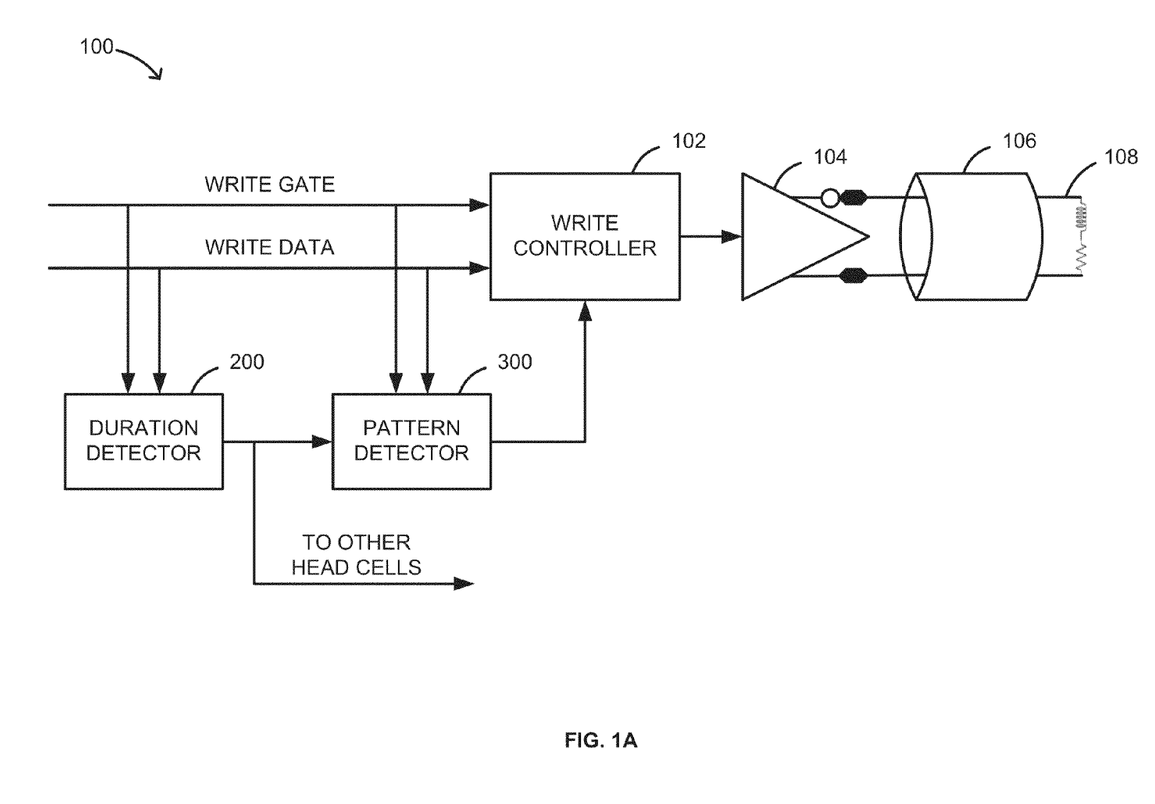
FIG. 1A is a block diagram illustrating a portion of a magnetic recording system including a magnetic recording head enabled to receive a pattern-dependent write (PDW) current, in accordance with an embodiment of the disclosure.

FIGS. 1A through 5 illustrate embodiments of a system and method for determining fundamental bit cell duration of a data record. The figures further illustrate embodiments of a magnetic recording system utilizing fundamental bit cell duration detection to enable adaptive pattern-dependent write (PDW) current control. FIG. 1A is a block diagram illustrating a write path of a magnetic recording system 100, according to an embodiment of the disclosure. According to various embodiments, the magnetic recording system 100 is enabled to perform PDWs by delivering multi-level write current to a magnetic recording head 108. In some embodiments, the magnetic recording system 100 includes components and configurations discussed in U.S. Pub. No. 2013/0128375, which is incorporated by reference in its entirety.

In an embodiment, the write path includes a write controller 102 configured to provide a PDW current to the magnetic recording head 108 via a write driver 104 coupled to a transmission line 106. The write controller 102 is driven according to a write gate input enabling the write controller 102 to deliver PDW current to the magnetic recording head 108 to record incoming write data to a magnetic storage medium, such as a hard disk drive (HDD) platter. The write path further includes a pattern detector 300 configured to provide a control signal to the write controller 102 based upon detected bit cell duration of at least one bit adjacent (e.g. preceding or succeeding) a bit being recorded. The PDW current provided by the write controller 102 is adjusted according to said control signal.

Figure 1B:
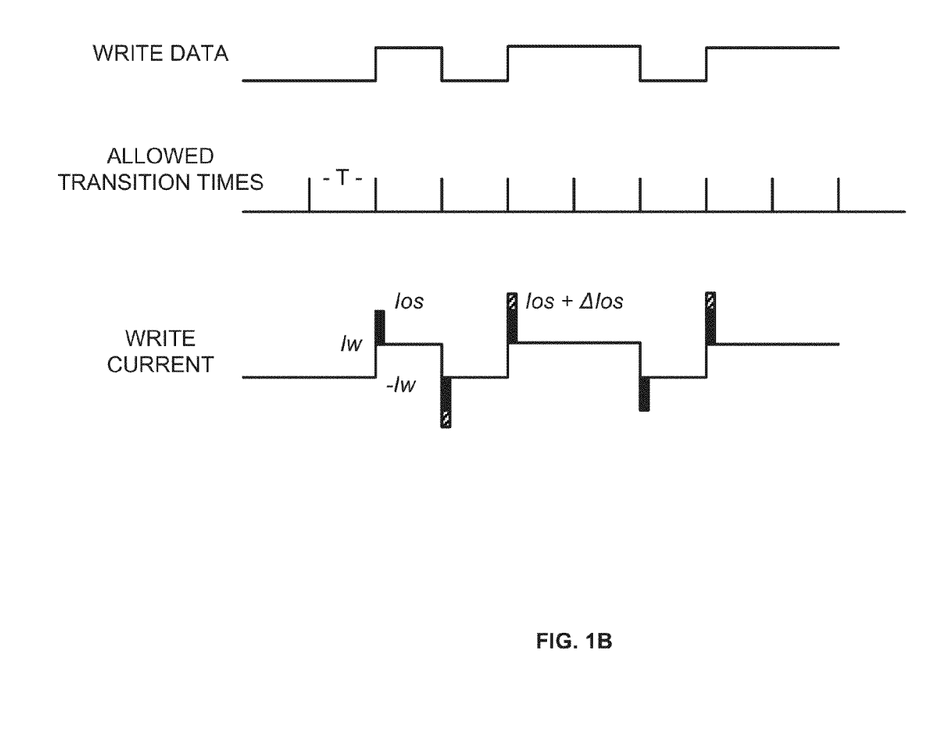
FIG. 1B illustrates waveforms corresponding to write data, allowed transition times of the write data, and PDW current associated with the write data, in accordance with an embodiment of the disclosure.

FIG. 1B shows a write data wave from according an embodiment of the disclosure. The bit cell durations of the write data bits are multiples of a fundamental bit cell duration T. A first portion of a data record includes write data having uniform transition periods (i.e. bit cell durations) that are a known or predetermined multiple of the fundamental bit cell duration T. In some embodiments, the first portion of the data record includes at least a portion of a preamble. The preamble is included in order to synchronize timing recovery circuits required to detect play-back read data. According to various embodiments, the first portion of the data record includes a preamble with substantially uniform bit cell durations (e.g. uniform 1T or 2T transition spacing). A duration detector 200 that is located in the write path is configured to determine the fundamental bit cell duration utilizing the first portion of the data recording having the uniform transition spacing. The pattern detector 300 is then configured to determine bit cell duration or length of other write data transitions as a function of the fundamental bit cell duration. It is advantageous, in order to reduce complexity, to share one or more of the duration detector 200, pattern detector 300, and write controller 102 between multiple write drivers 104. In some embodiments, some or all of the elements in FIG. 1A may be incorporated within a preamplifier chip which is mounted in proximity to recording heads 108.

As shown in FIG. 1B, the write current overshoot amplitude los or duration is increased to a more aggressive overshoot amplitude los+Δlos or duration when the adjacent bit cell duration is shorter. In some embodiments, amplitude of the write current delivered to the magnetic recording head 108 is increased by a first overshoot amplitude los when a preceding portion of recorded data has a bit cell duration greater than 1T (i.e. 2T) and increased by a second (more aggressive) overshoot amplitude los+Δlos when the preceding portion of recorded data has a bit cell duration of 1T. Although only two overshoot values are described in the foregoing embodiment, any number of current overshoot amplitude levels or durations may be employed. Look-ahead may also be employed to introduce overshoot amplitude dependence on prior bitcells.

Figure 2A:
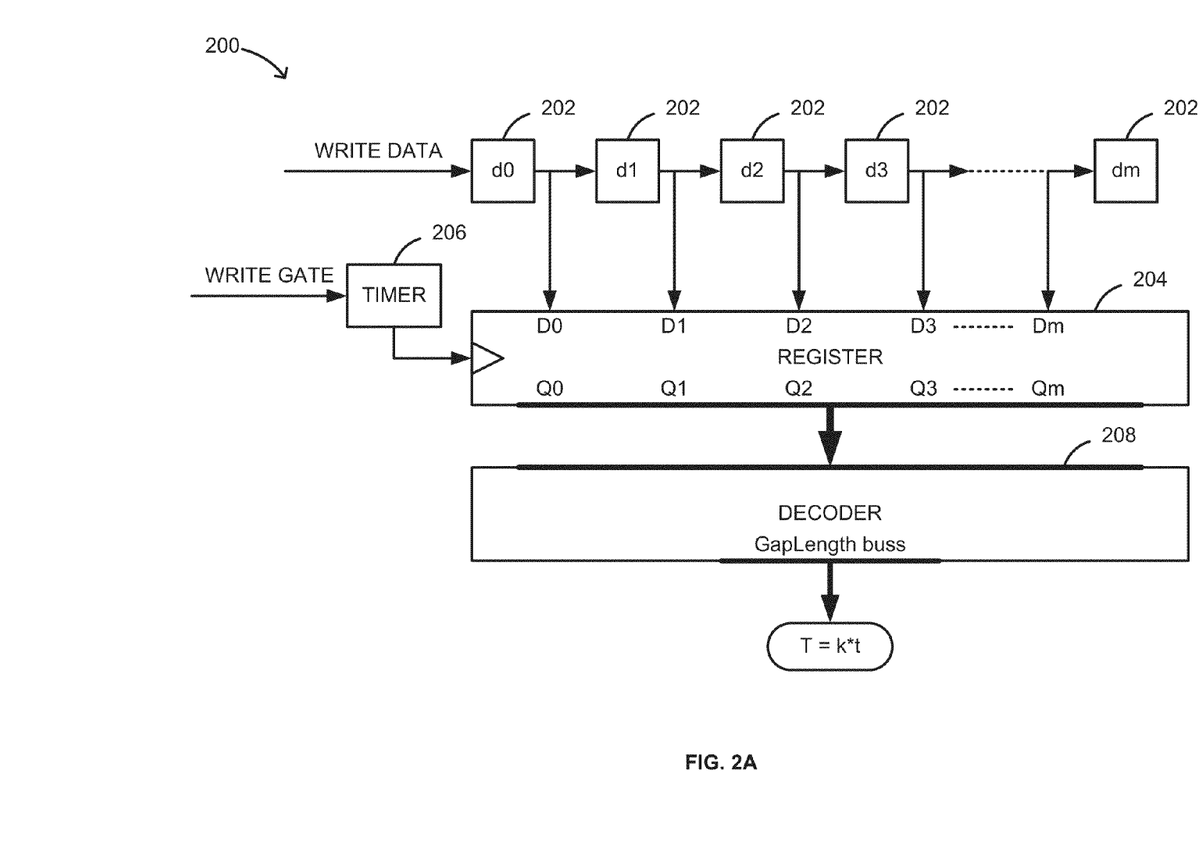
FIG. 2A is a block diagram illustrating a system for determining fundamental bit cell duration of a data record, in accordance with an embodiment of the disclosure.
Figure 2B:
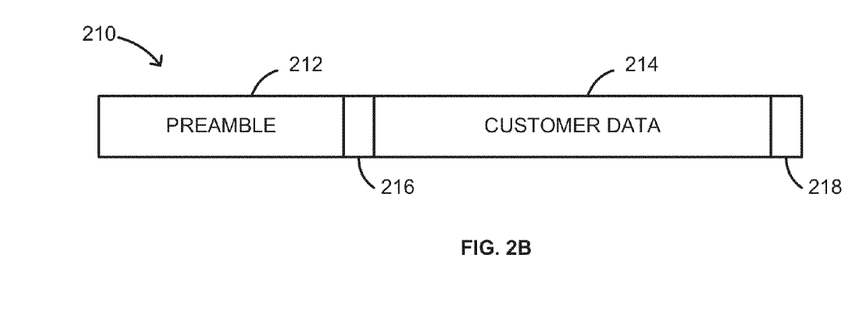
FIG. 2B is illustrates various components of a data record.
Figure 2C:
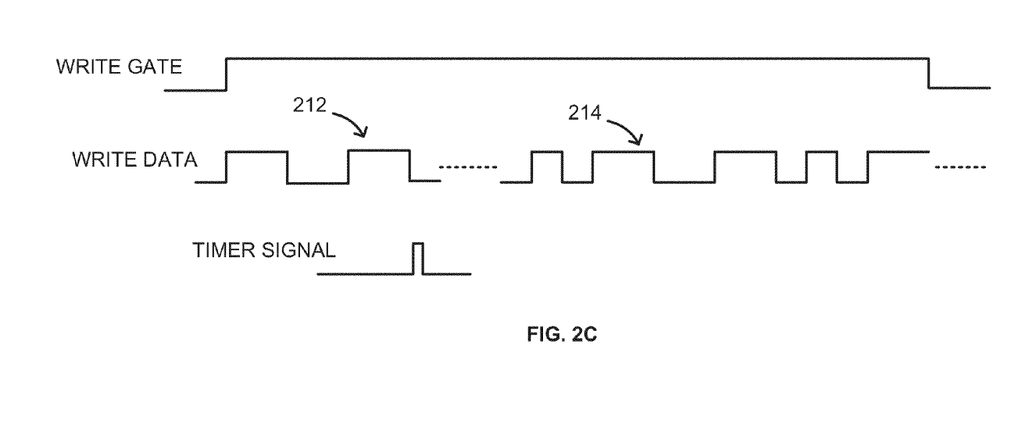
FIG. 2C illustrates waveforms corresponding to a write gate signal, write data, and a timer signal based upon the write gate signal, in accordance with an embodiment of the disclosure.

The duration detector 200 is further illustrated in FIGS. 2A through 2C, according to various embodiments of the disclosure. The duration detector 200 is configured to determine the duration of a 1T interval (i.e. the fundamental bit cell duration), by sampling at least one portion of a data record, such as the preamble, having a predetermined or known bitcell duration that is a fixed value (e.g. 1T or 2T). The duration detector 200 includes a plurality of delay units 202 configured to receive at least a first portion of a data record 210 (illustrated in FIG. 2B) including at least one bit cell duration that is a known or predetermined multiple (e.g. 1T or 2T) of the fundamental bit cell duration T. In some embodiments, the first portion of the data record 210 includes at least a portion of the preamble 212 of the data record 210. Data records 210 are accompanied by a preamble 212, typically 16 bytes long, which is provided for read synchronization during data readback, of timing recovery circuits in the recording channel, in preparation for reception of stored user data 214 (or "customer data"). The preamble-to-customer data boundary is identified by a synchronization mark 216. In some embodiments, the data record 210 further includes an error correction code (ECC) field 218 to protect data integrity of the user data 214.

Typically, as shown in FIG. 2C, bit cell durations within the preamble 212 are uniformly 2T. On the other hand, data transitions within the remaining fields of the record occur irregularly at n*T intervals, where 1≤n≤R, and R is the maximum run-length of the data record 210. Individual transition locations within any of the synchronization mark 216, user data 214, and ECC field 218 may be further modulated from their nominal positions by PDW pre-compensation. However, because the preamble 212 is a uniform field, no pre-compensation is applied. As such, it is advantageous for the first portion of the data record 210 sampled by the duration detector 200 to include at least a portion of the preamble 212 or any other data segment exhibiting similar predetermined or known uniformity.

According to various embodiments, each of the delay units 202 is configured to provide a substantially equivalent delay t, where t is substantially smaller than T. In some embodiments, the delay units 202 include a plurality of primitive buffers, invertors, or combinational logic elements (e.g. AND, OR, NAND gates, and the like) with uniform delay properties. The delay units 202 are daisy chained, and the output of each delay unit is further coupled to a register 204. In some embodiments, the register 204 includes parallel-in-parallel-out (PIPO) D-register having good metastability hardness. The register 204 is configured to store binary outputs or states of the delay units 202 when it receives an activation impulse from a timer 206, such as a monostable timer circuit. The timer signal includes a delayed and pulse-shaped version of the write gate or is synchronized with the write gate. In some embodiments, the timer 206 is configured to strobe the register sufficiently long enough after detecting the initial assertion of write gate to allow the first portion of the data record 210 including at least one full bit cell to be received by the plurality of delay units 202. In some embodiments, the plurality of delay units 202 includes at least m+1 cascaded delay units 202, where m*t≥2T so that at least one full half-cycle of the preamble 212 is in the delay chain when it is sampled.

The duration detector 200 further includes a decoder 208, such as combinational decoder logic, in communication with the register 204. In some embodiments, D<m:0> inputs of the register 204 are configured to receive the binary outputs of the delay units 202 and Q<m:0> outputs of the register 204 are configured to relay a stored version of the binary outputs to the decoder 208. The decoder 208 is configured to determine the fundamental bit cell duration T as a function of t by decoding the register contents. In some embodiments, the decoder is configured to determine the number k of delay units outputting a "1" or "0" when the first portion of the data record 210 is sampled. The actual duration of the delay t does not necessarily need to be a known value because T can be determined in terms of delay units. Since T≈k*t, the fundamental bit cell duration T can be approximately expressed as a number k of delay units. Thus, as the actual delay times of delay units 202 vary with process and environment, k will adapt to reflect this variation. In some embodiments, discussed in further detail below, a second plurality of delay units known to provide a substantially equivalent delay t are used for pattern detection so that the actual value of t is not required.

According to an embodiment, combinatorial Verilog code required to implement the decoder 208, for the case of m=15 (a 16-bit-wide DFF register 204), includes the following:

```
'timescale 1 ns/10 ps
module DurationDecoder (Q, Gaplength);
    input [15:0] Q; // from D register
    output [3:0] GapLength; // binary representation of
       GapLength
    reg [3:0] GapLength
    reg StartCount, EndCount;
    integer K;
// Count number of Q bits between state changes in Q and
    encode onto GapLength
    always @ (Q) begin
       GapLength=0;
       StartCount=0;
       EndCount=0;
       for (K=1; K<=15; K=K+1) begin
         if ((StartCount==1) && (Q[K-1]^Q[K])) // second
            transition
            EndCount=1;
         if (Q[K-1]^Q[K]) // first transition
            StartCount=1;
         if (StartCount==1 && EndCount==0)
            GapLength=GapLength+1;
       end
    end
endmodule
```

Note that logic propagation delay is noncritical. it is required only that GapLength<p:0> be valid before onset of the Mark character and subsequent data field. No additional holding registers are necessary, as the D-Register is strobed only once for each record. The Verilog routine searches Q<m: 0> for a first and second full polarity transition and binarily encodes the distance between them onto the GapLength buss. The term "GapLength" is sometimes used herein to refer to the chain of delay units encoding a bit cell duration.

In some embodiments, delay unit outputs are stored into the register 204 and decoded for each written data record 210 (i.e. once per write gate cycle). Hence, the determined fundamental bit cell duration T=k*t output remains valid over the entire data record 210 and can be used as a bit cell duration ruler for subsequently recorded portions of the data record 210, such as portions of the user data 214, synchronization mark 216, ECC field 218, and the like. The T=k*t output is distributed non-time-critically to individual pattern detectors 300 in a plurality of writer headcells or to a common pattern detector 300. The GapLength (k*t) output may be level-shifted by slow translators, as required in some writer designs.

Figure 3A:
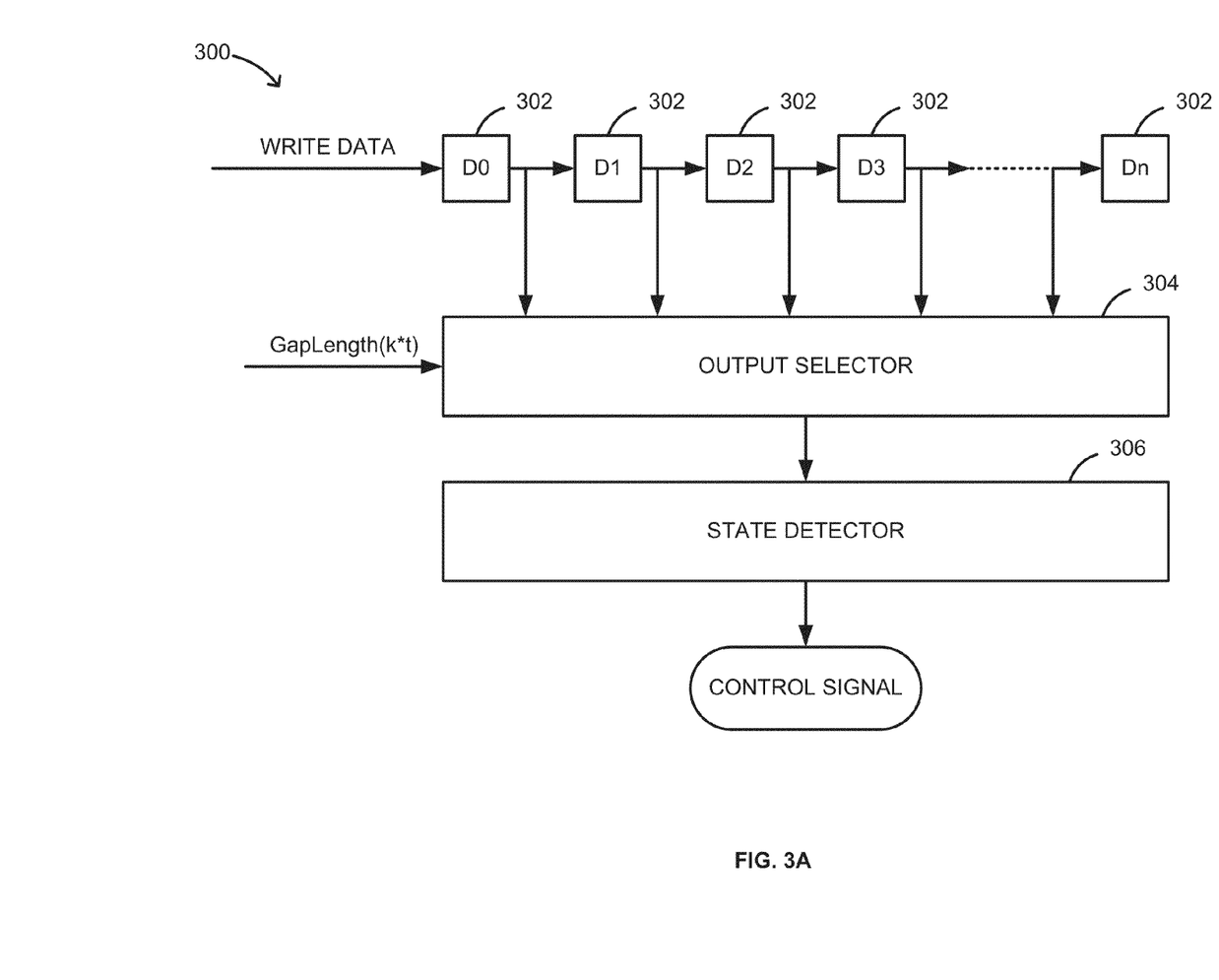
FIG. 3A is a block diagram illustrating a system for determining bit cell duration of one or more portions of a data record based upon the fundamental bit cell duration of the data record, in accordance with an embodiment of the disclosure.

In some embodiments, as illustrated in FIG. 3A, the pattern detector 300 is configured to receive the GapLength or T=k*t output or a scaled version of the GapLength or T=k*t output from the duration detector 200 as an adaptive input for PDW control. The pattern detector 300 is "adaptive" in the sense that a data record 210 can be processed according to respectively determined fundamental bit cell duration. Differences in transition spacing from one data record to the next are thus accounted for. Although the embodiment illustrated in FIG. 3A is described in terms of look-back architecture to detect preceding bit cell duration, the concept is extensible look-ahead architectures and more elaborate approaches. Although some embodiments of the pattern detector 300 are described herein, the PDW enabled magnetic recording system 100 is not limited to said embodiments. The pattern detector 300 includes any system configured to determine bit cell duration of one or more portions of a data record as a function of an adaptively determined fundamental bit cell duration T.

In an embodiment, the pattern detector 300 includes a plurality of delay units 302, each delay unit 302 also having a delay substantially equivalent to t. In other embodiments, the delay units 202 and 302 may have known delay values or a predetermined relationship to enable conversion between duration detection and pattern detection values. The delay units 302 are configured to receive at least a second portion of the data record 210 being recorded, such one or more portions of user data 214. An output selector 304 coupled to the delay units 302 is configured to select a delay unit output to sample write data delayed according to the scaled fundamental bit cell duration s*T=s*k*t. The output of the selected delay unit 302 is fed into a state detector 306 configured to output a control signal to the write controller 102 based upon the detected transition state, where the detected transition state is indicative of the bit cell duration of the second portion of the data record 210. The write controller 102 is then enabled to provide a current overshoot setting based upon the bit cell duration of the second portion of the data record 210 to perform a PDW of a third portion of the data record 210, such as a subsequently recorded portion of user data 214 (i.e. succeeding bit).

Figure 3B:
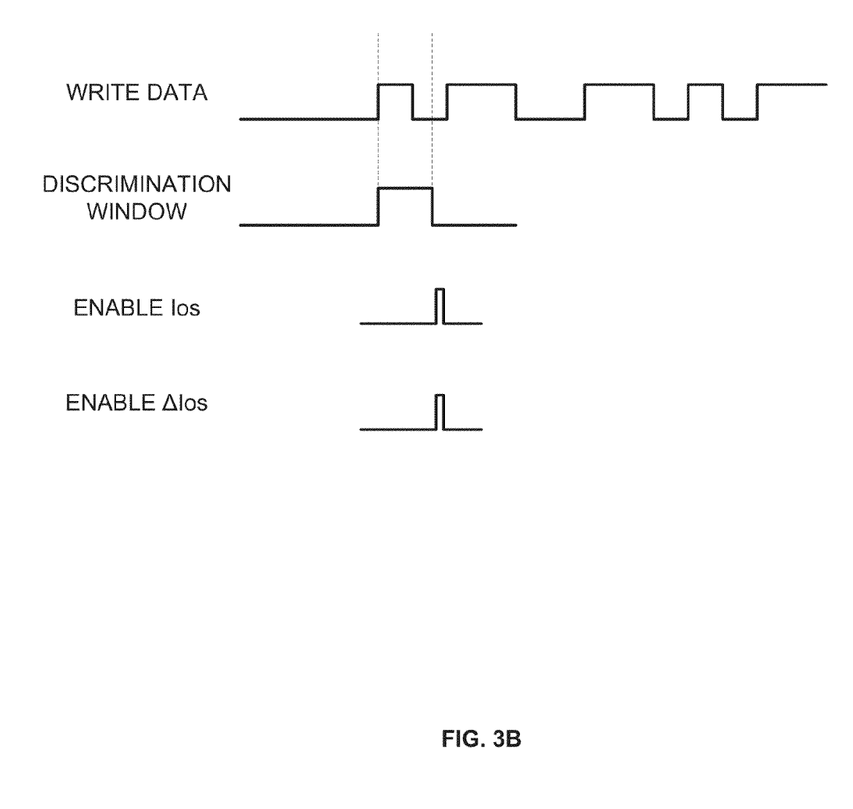
FIG. 3B illustrates waveforms corresponding to write data, a discrimination window associated with a pattern detection delay chain, and corresponding control signals, in accordance with an embodiment of the disclosure.

In some embodiments, the selected output reflects a delay through the delay chain of greater than T (e.g. ~3T/2) to establish a discrimination window midway between two bit cells, as shown in FIG. 3B. Accordingly, the delay chain includes at least n+1 delay units 302, where n*t≥T. If the write data propagating through the delay chain to the selected delay output remains at the same "1" or "0" binary state, then the state detector 306 indicates a bit cell duration of greater than 1T (i.e. ≥2T) which corresponds to a less aggressive overshoot setting Ios. If the write data propagating through the delay chain to the selected output changes states, as illustrated in FIG. 3B, then the state detector 306 indicates a bit cell duration of 1T which corresponds to a more aggressive overshoot setting Ios+ΔIos. The state detector 306 provides the corresponding control signal to the write controller 102 to control the PDW current delivered to the magnetic recording head 108. As mentioned above, any number of overshoot settings or levels can be implemented by extending the delay chain to account for more bit cell durations (e.g. 1T, 2T, 3T, and so on).

Figure 4A:
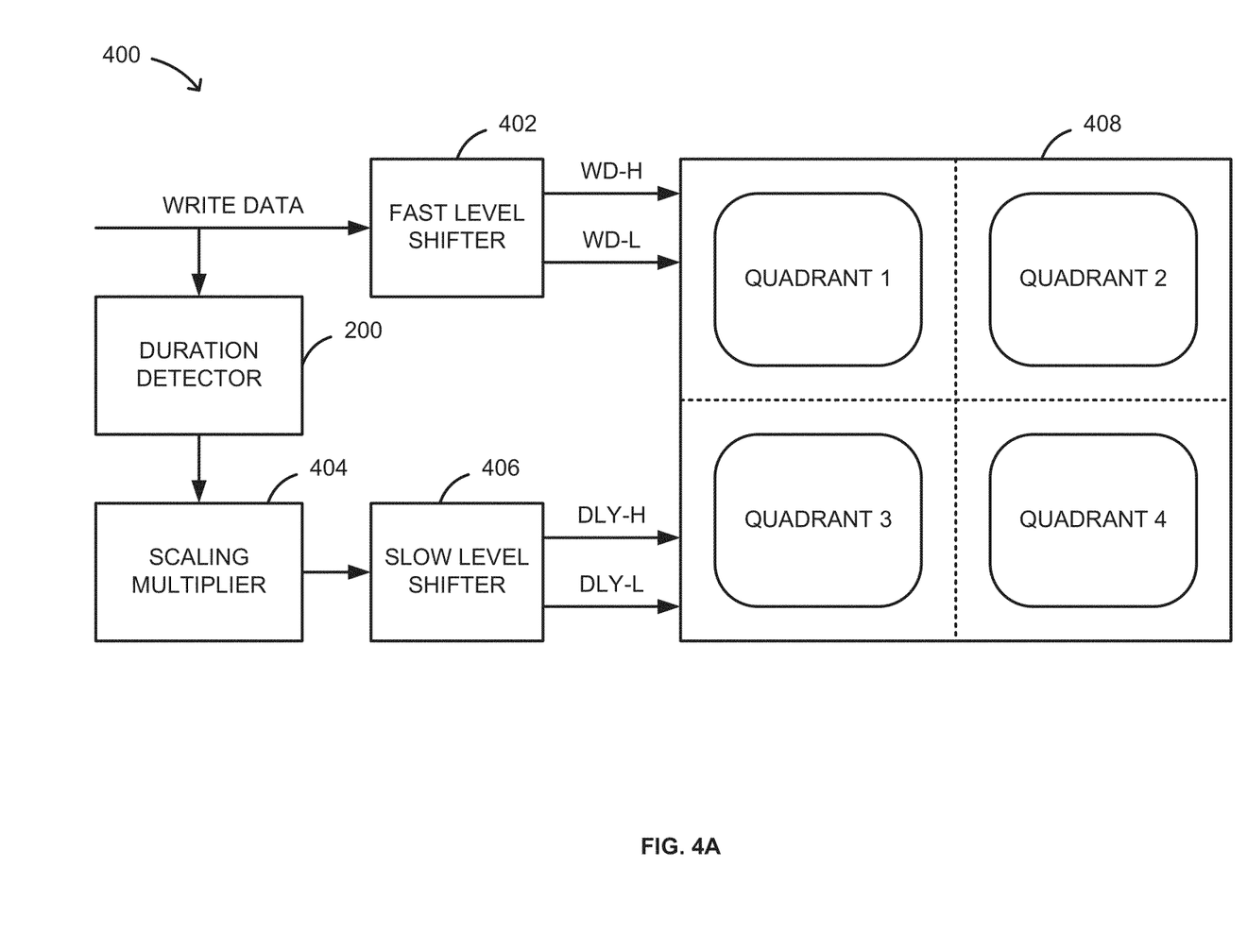
FIG. 4A is a block diagram illustrating a writer circuit for a magnetic recording system, where a portion of a PDW current control system is shared between writer quadrants, in accordance with an embodiment of the disclosure.
Figure 4B:
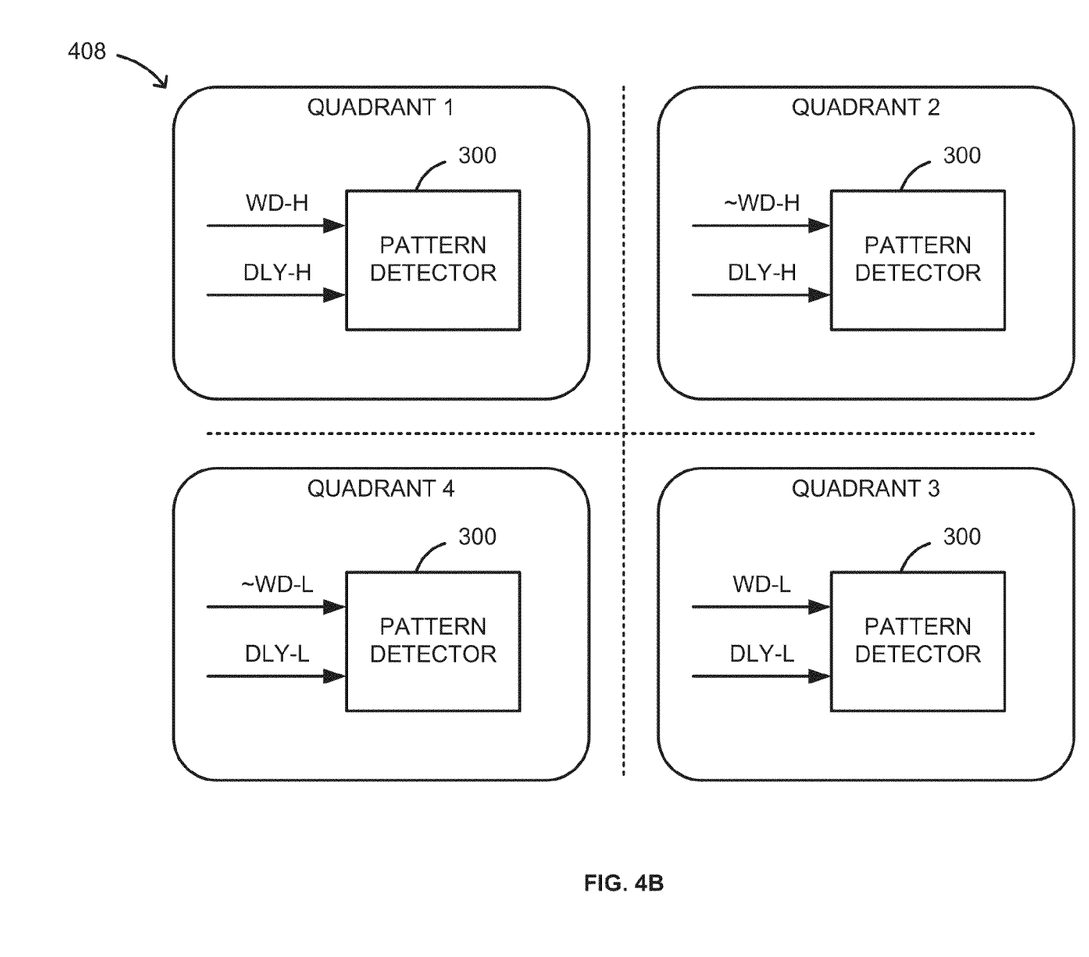
FIG. 4B is a block diagram illustrating each quadrant of the writer circuit including at least a portion of the PDW current control system, in accordance with an embodiment of the disclosure.

FIGS. 4A and 4B illustrate an embodiment of writer circuit 400 including the bit cell duration detector 200 and the pattern detector 300 described herein. In some embodiments, the duration detector 200 is shared among multiple writer quadrants 408. The fundamental bit cell duration T or GapLength determined by the duration detector 200 is scaled via a multiplier 404 and communicated to a shared pattern detector 300 or to each of a plurality of respective pattern detectors 300 for each quadrant 408, as shown in FIG. 4B. The scaling multiplier 404 multiplies by a factor (e.g. s=3/2) to establish a discrimination window to distinguish 1T from 2T bit cells, as discussed above with reference to FIGS. 3A and 3B. In some embodiments, the scaled fundamental bit cell duration s*T or scaled GapLength is distributed after level-shifting via slow level shifter 406 to the four writer quadrants 408, two at high rail levels and two at low rail levels. Write data is also distributed to the four quadrants after level-shifting via fast level shifter 402. Diagonally-opposed bridge quadrants 408 are activated to deliver current to the magnetic recording head 108 in either of two directions.

Figure 5:
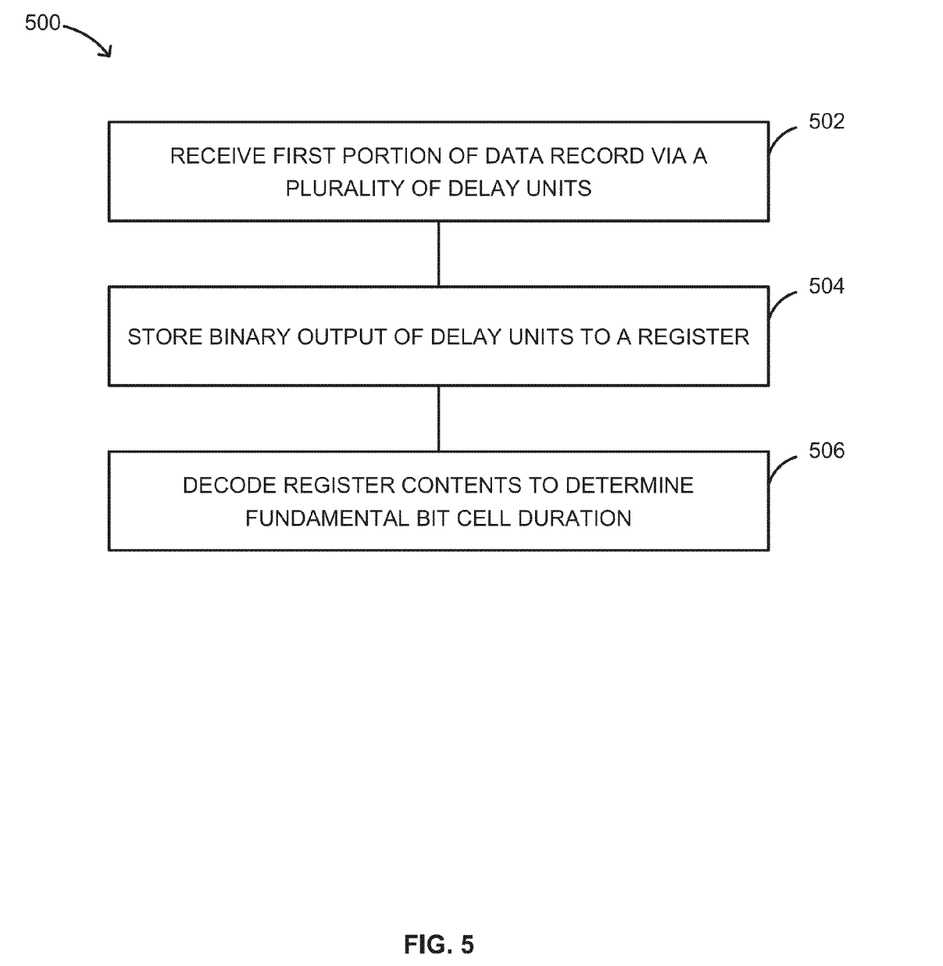
FIG. 5 is a flow diagram illustrating a method of determining fundamental bit cell duration of a data record, in accordance with an embodiment of the disclosure.

FIG. 5 illustrates an embodiment of a method 500 of determining fundamental bit cell duration of a data record in accordance with the foregoing systems 100, 200, 300, and 400. In some embodiments, method 500 is manifested by system 200, and as such, the method 500 includes any step or operation required to directly or indirectly carry out any function described with regard to an embodiment of system 200. Furthermore, the method 500 includes at least the following steps.

At step 502, a first portion of a data record is received by a plurality of delay units. The first portion of write data includes at least a portion of the preamble or any other portion of the data record having known predetermined transition spacing (i.e. a known multiple of the fundamental bit cell duration). As write data propagate through a chain of the delay units, the delay units output a binary HIGH or LOW state. When the first portion of the data record including at least one full bit cell duration are received by the delay units, the binary outputs are representative of the bit cell duration as a function of t, where t is a substantially uniform delay exhibited by each of the delay units.

At step 504, the binary outputs are stored to a register while the first portion of the data record is in the delay chain. The register may be strobed as a function of the write gate to ensure the first portion of write data propagating through the delay units when the outputs are stored includes at least one full bit cell duration. The register contents are decoded at step 506 to determine the fundamental bit cell duration T of the data record as a function of t, $T=k*t$, where k is the number of delay units adding up to a propagation delay substantially equivalent to the fundamental bit cell duration T. As such, the fundamental bit cell duration T is discretely quantified (i.e. approximated in terms of k) and can be used to calibrate pattern detection for PDW current control in a magnetic recording system.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for determining fundamental bit cell duration of a data record, comprising:
a plurality of delay units configured to receive at least a first portion of a data record;
at least one register configured to store a binary output of each delay unit of the plurality of delay units when the plurality of delay units have received the first portion of the data record; and
a decoder configured to determine a fundamental bit cell duration based upon the stored binary outputs of the plurality of delay units;
wherein the first portion of the data record includes a bit cell with a duration that is a multiple of the fundamental bit cell duration;
wherein the fundamental bit cell duration is half of the duration of the bit cell of the first portion of the data record;
wherein each delay unit of the plurality of delay units is configured to provide a delay of approximately t, where t is a substantially fixed duration;
wherein the decoder is configured to determine the fundamental bit cell duration as a function of t;
wherein the plurality of delay units includes at least m+1 delay units, and wherein $m*t \geq 2T$, where m is an integer and T is the fundamental bit cell duration.

2. The system of claim 1, wherein the first portion of the data record includes at least a portion of a preamble of the data record.

3. The system of claim 2, wherein the preamble of the data record includes bit cells with uniform durations.

4. A system for pattern-dependent magnetic recording, comprising:
a fundamental bit cell duration detector including: a plurality of delay units configured to receive at least a first portion of a data record; at least one register configured to store a binary output of each delay unit of the plurality of delay units when the plurality of delay units have received the first portion of the data record; and a decoder configured to determine a fundamental bit cell duration based upon the stored binary outputs of the plurality of delay units;
a pattern detector configured to receive at least a second portion of the data record, and further configured to determine a bit cell duration of the second portion of the data record as a multiple of the fundamental bit cell duration; and
a magnetic write head configured to receive a write current to record a third portion of the data record, wherein the write current is based upon the bit cell duration of the second portion of the data record;
wherein each delay unit of the plurality of delay units is configured to provide a delay of approximately t, and wherein the decoder is configured to determine the fundamental bit duration as a function of t, where t is a substantially fixed duration;
wherein the plurality of delay units includes at least m+1 delay units, and wherein $m*t \geq 2T$, where m is an integer and T is the fundamental bit cell duration;
wherein the pattern detector includes a second plurality of delay units, and wherein each delay unit of the second plurality of delay units is configured to provide a delay of approximately t;
wherein the second plurality of delay units includes at least n+1 delay units, and wherein $n*t \geq T$, where n is an integer and T is the fundamental bit cell duration.

5. The system of claim 4, wherein the first portion of the data record includes at least a portion of a preamble of the data record, wherein the second portion of the data record includes at least a portion of a user data of the data record, and wherein the third portion of the data record includes at least a portion of the user data of the data record.

6. The system of claim 4, wherein the second portion of the data record is adjacent to the third portion of the data record.

7. A method of determining fundamental bit cell duration of a data record, comprising:

receiving at least a first portion of a data record via a plurality of delay units;

storing a binary output of each delay unit of the plurality of delay units when the plurality of delay units have received the first portion of the data record; and determining a fundamental bit cell duration based upon the stored binary outputs of the plurality of delay units;

wherein the first portion of the data record includes a bit cell with a duration that is a multiple of the fundamental bit cell duration;

wherein each delay unit of the plurality of delay units provides a delay of approximately t, and wherein the fundamental bit duration is determined as a function of t, where t is a substantially fixed duration;

wherein the plurality of delay units includes at least m+1 delay units, and wherein $m*t \geq 2T$, where m is an integer and T is the fundamental bit cell duration.

8. The method of claim 7, wherein the first portion of the data record includes at least a portion of a preamble of the data record, and wherein the preamble of the data record includes bit cells with uniform durations.

9. The system of claim 1, wherein the data record further includes an error correction code field.

10. The system of claim 1, wherein the decoder is configured to determine a number of delay units outputting a "1" or a "0" when the first portion of the data record is sampled.

11. The system of claim 4, wherein the data record further includes an error correction code field.

12. The system of claim 4, wherein the decoder is configured to determine a number of delay units outputting a "1" or a "0" when the first portion of the data record is sampled.

13. The method of claim 7, wherein the data record further includes an error correction code field.

14. The method of claim 7, wherein the decoder is configured to determine a number of delay units outputting a "1" or a "0" when the first portion of the data record is sampled.

* * * * *